(12) United States Patent
Henderson

(10) Patent No.: US 11,029,159 B2
(45) Date of Patent: Jun. 8, 2021

(54) NAVIGATION SYSTEM

(71) Applicant: Atlantic Inertial Systems Limited, Plymouth (GB)

(72) Inventor: Geoffrey Thomas Henderson, Yelverton (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 0 days.

(21) Appl. No.: 16/564,784

(22) Filed: Sep. 9, 2019

(65) Prior Publication Data

US 2020/0116491 A1 Apr. 16, 2020

(30) Foreign Application Priority Data

Oct. 15, 2018 (GB) .................................. 1816779.1

(51) Int. Cl.
*G01C 21/20* (2006.01)
*G01C 3/08* (2006.01)
*G01S 17/933* (2020.01)

(52) U.S. Cl.
CPC .............. *G01C 21/20* (2013.01); *G01C 3/08* (2013.01); *G01S 17/933* (2013.01)

(58) Field of Classification Search
CPC .................................. G01C 21/00; G01C 3/08
See application file for complete search history.

(56) References Cited

U.S. PATENT DOCUMENTS

| 5,892,462 A | 4/1999 | Tran |
| 6,389,354 B1 | 5/2002 | Hicks et al. |
| 7,715,978 B1 | 5/2010 | Wenger et al. |
| 8,072,581 B1 | 12/2011 | Breiholz |
| 8,346,480 B2 * | 1/2013 | Trepagnier ............... G05D 1/00 701/514 |

(Continued)

FOREIGN PATENT DOCUMENTS

| CN | 101762269 A | 6/2010 |
| GB | 2162014 A | 1/1986 |
| GB | 22643836 A | 9/1993 |

OTHER PUBLICATIONS

Extended European Search Report for International Application No. 19198716.3 dated Mar. 9, 2020, 7 pages.

(Continued)

*Primary Examiner* — Jamel E Williams
(74) *Attorney, Agent, or Firm* — Cantor Colburn LLP

(57) ABSTRACT

A terrain-based navigation system include at least three laser range finders, each fixedly mounted to a vehicle body, each pointing in a different direction and arranged such that they can be used to calculate terrain gradient in two dimensions. Existing terrain-based navigation systems for aircraft that use a radar altimeter to determine the distance of the vehicle from the ground make use of the large field of view of the radar altimeter. The first return signal from the radar altimeter may not be from directly below the aircraft, but will be interpreted as being directly below the aircraft, thereby impairing the chances of obtaining a terrain match, or impairing the accuracy of a terrain match. The use of a plurality of laser range finders each fixedly mounted to the vehicle body allows more terrain information to be obtained as the terrain can be detected from the plurality of different directions.

14 Claims, 3 Drawing Sheets

(56) References Cited

U.S. PATENT DOCUMENTS

| | | |
|---|---|---|
| 8,755,997 B2 | 6/2014 | Au et al. |
| 8,903,576 B2 | 12/2014 | Tink |
| 9,041,915 B2 | 5/2015 | Earhart et al. |
| 9,653,003 B2 | 5/2017 | Laine et al. |
| 10,029,804 B1 | 7/2018 | Chamberlain et al. |
| 2017/0314924 A1 | 11/2017 | Royster et al. |

OTHER PUBLICATIONS

IPO Search Report for International Application No. 1816779.1 dated Apr. 5, 2019, 3 pages.

\* cited by examiner

NAVIGATION SYSTEM

FOREIGN PRIORITY

This application claims priority to Great Britain Patent Application No. 1816779.1 filed Oct. 15, 2018, the entire contents of which is incorporated herein by reference.

TECHNICAL FIELD

The present disclosure relates to navigation systems, particularly to terrain-based navigation systems.

BACKGROUND

Inertial navigation systems (INS) are often used by vehicles (e.g. aeroplanes, ships, submarines and cars) as part of the vehicle's navigation system to determine the vehicle's navigational data (e.g. position, velocity, acceleration and attitude of the vehicle). The navigational data may for example be used to check whether the vehicle is navigating along a desired route and to determine suitable course corrections when off-route. An estimate of the uncertainty in the data will often also be monitored.

Typically, the vehicle's acceleration and rotation are measured using inertial sensors such as accelerometers and gyroscopes. The INS derives the vehicle's velocity and location information from the outputs of these sensors. Small errors in the measuring capabilities of the accelerometers or in the balance of the gyroscopes can over time lead to build up of large errors in the outputs of the INS. Such errors can lead to significant errors in estimates of vehicle location (and/or velocity, attitude, etc.) and can be problematic for navigation decisions, for example resulting in false course corrections. Typically, the errors in the INS position estimates drift at a rate of around 2 nautical miles per hour due to the integration over time of errors within the accelerometer and gyroscope sensors within the INS.

An INS may form the core of a vehicle's integrated navigation system. The INS itself is self-contained and once initialised has no reliance on other navigation systems or sources of information external to the vehicle. The error characteristics of an INS are such that they are well understood mathematically. Also, while over the duration of a mission the position error may grow to several miles, in the short term the errors are more stable. Where other navigation sensors can provide navigation information, that information can be blended with the INS data in an integrated system using techniques such as Kalman Filtering to model and calibrate the errors in the INS. These errors are then removed from the INS navigation solution to provide the Integrated Navigation Solution. Navigation sensors that may be used to support the INS in an integrated system typically include GPS, radio navigation aid or Terrain Referenced Navigation (TRN).

Even in an integrated system, there are situations where the INS will provide the primary source of navigation data for the vehicle. Such situations may arise where other navigation aids such as GPS are unavailable or cannot be trusted (e.g. when they are jammed or there is a suspicion that they may be spoofed). The INS navigates by dead reckoning based on the onboard sensors which cannot so easily be jammed or spoofed.

Terrain Referenced Navigation (TRN) systems, also referred to as terrain-based navigation systems provide another way of estimating the location of a vehicle. A TRN system can be integrated with other navigation systems as discussed above. A TRN system in an aircraft typically operates by taking a radar altimeter measurement of the aircraft's height above ground and subtracting that from a measurement of altitude above mean sea level (MSL) which may be a barometric altitude measurement or could be obtained from GPS or other means. The resulting difference is a measurement of the height of the ground below the aircraft above MSL. As an aircraft flies over terrain, taking a series of such measurements builds up a terrain profile which can be matched to a stored, on-board terrain map using correlation techniques. By matching the measured terrain profile with the stored terrain profile, the TRN system estimates the current position of the aircraft.

In such TRN systems, the amount of data available from the terrain measurements is very important for obtaining a good match. A fast jet covers a lot of ground and can obtain enough terrain information in a few seconds to get a good location match. On the other hand a TRN system in a hovering helicopter continually measures the same piece of ground and will not build up enough terrain information to get a good location fix.

SUMMARY

According to one aspect, this disclosure provides a terrain-based navigation system comprising: at least three laser range finders, each fixedly mounted to a vehicle body, each pointing in a different direction and arranged such that they can be used to calculate terrain gradient in two dimensions.

Existing terrain-based navigation systems for aircraft that use a radar altimeter to determine the distance of the vehicle from the ground make use of the large field of view of the radar altimeter to ensure that it can see the ground directly below the aircraft across a wide range of aircraft attitudes. The first return signal from the radar altimeter will be from the closest reflecting surface and is therefore considered to be the vertical distance to ground. However, this does not always hold true in particularly contorted terrain, e.g. when flying close to a steep escarpment. In such scenarios the terrain-based navigation system may get a first return signal that is not from directly below the aircraft, but will be interpreted as being directly below the aircraft, thereby impairing the chances of obtaining a terrain match, or impairing the accuracy of a terrain match.

Laser range finders have a narrow field of view and there is therefore no issue with the return signal coming from a different direction from the expected one. A complication is that the navigation system needs to know the direction in which the laser range finder is pointed so that it can take account of the geometry and determine where the return signal came from.

Another problem with terrain-based navigation systems, as discussed above, is that at slow speeds, e.g. as can be the case for helicopters or other hovering aircraft, terrain data is not acquired sufficiently fast from a radar altimeter that only sees the first return signal from directly beneath the vehicle, i.e. the terrain is not traversed sufficiently fast for the profile of the Earth observed by the radar altimeter to give enough information to determine the vehicle's position relative to the Earth. One solution is to use a range finder with a narrow field of view and sweep it relative to the vehicle so as to acquire information from directions other than directly beneath the vehicle. In this way, information in the surrounding terrain can be acquired and used in the correlation process to match to stored terrain data. However, the mechanical set up for such sweeping systems can be very expensive. Gimballed mounts for the transmitter or for mirrors or prisms that redirect the beam require motors and sensors to operate them and to feed back position information. Also, such mounts are susceptible to the vibrations experienced by the vehicle and represent potential failure points of the system. It is difficult, and expensive, to design bearings that can cope with this vibrational environment while maintaining accuracy and reliability. Therefore there is a trade-off between the additional information obtainable by such systems and the added cost and complexity of designing, installing and maintaining them.

The use of a plurality of laser range finders each fixedly mounted to the vehicle body allows more terrain information to be obtained as the terrain can be detected from the plurality of different directions, while allowing the system to remain relatively simple and cost-effective by not requiring complex mechanical mounting structures. Therefore terrain-based navigation can be improved even in slow moving or stationary vehicles by collecting the information from a plurality of different laser range finders pointing in different directions.

In some examples, the angle between the directions of at least two of the laser range finders is no more than 30 degrees. As the angle between the two laser range finders increases, so does the distance on the ground between the two points of reflection. If these points get too far apart then there may be profile features of the terrain that lie between the two points and that are not taken into account. It is preferred that the slope of the terrain between the two points be relatively constant or at least that the slope calculated from the two points be representative of the terrain across the area between those points. In other examples, the angle between the two laser range finders may be no more than 20 degrees or no more than 10 degrees.

The angle between the directions of at least two of the laser range finders may be at least 5 degrees. If the two laser range finders are too close together in direction then they will essentially be sampling the same region rather than acquiring different data. In other examples, the angle between the two laser range finders may be at least 10 degrees.

In preferred examples, the direction of each of at least three laser range finders is at an angle of at least 5 degrees from each other laser range finder. This arrangement ensures a three-dimensional spread of the beams that will encompass a significant two-dimensional area of terrain from which a two-dimensional gradient can be calculated.

It will be appreciated that the optimal angle (or range of angles) between the laser range finders will vary depending on the expected distance to the terrain (e.g. the expected flying height of an aircraft) and therefore the angle may be chosen as required according to the circumstances. The appropriate angles will be selected at the design stage, but are then fixed to the vehicle body, i.e. not adjusted during or between uses.

The terrain-based navigation system comprises at least three laser range finders, each fixedly mounted to a vehicle body and each pointing in a different direction. Any number greater than three may be used. Each additional laser range finder can be pointed in a different direction so as to acquire additional terrain information for a better and faster location fix. However, one particular advantage of at least three laser range finders is that they can, in preferred examples be arranged such that the beam directions of the least three laser range finders are not co-planar. This ensures that a two dimensional area of the terrain is sampled, thus providing more information and improved correlation and matching.

In some examples with at least three laser range finders, the three laser range finders may be arranged at a vertex of a notional tetrahedron and each of the three laser range finders may be directed along a different edge of the notional tetrahedron. Thus each laser range finder is essentially directed at a different vertex of the tetrahedron. The tetrahedron may be irregular, but in preferred examples it is regular or near-regular (i.e. with substantially the same angle between any pair of the three laser range finders) so that the two dimensional area of the surface of the terrain that is sampled has a comparable magnitude in all dimensions (to at least an order of magnitude).

The terrain-based navigation system may further comprise a processor arranged to receive range data from each of the plurality of laser range finders and to use the range data together with known angles between the directions of the laser range finders to calculate terrain gradient information in two dimensions. The calculation of terrain gradient data is something that can only be done with multiple measurements of the terrain, but it potentially allows a terrain match to be obtained even for a stationary or slow moving vehicle. More particularly, the acquisition of two dimensional gradient data from a single position means that the vehicle does not need to move at all to obtain a gradient and thus a terrain match may be obtainable for a vehicle that is stationary with respect to the ground. For example, a hovering helicopter which detects a slope with a certain gradient directly beneath it may be able to determine with a high degree of accuracy where it is located if that slope is unique within the vehicle's possible range of positions. Particularly for a slow moving vehicle, the change of gradient can be used to match to the profile of a hill or valley much faster and more reliably than with a single source of range data such as a radar altimeter. For example, it can be appreciated that while terrain gradient data can be obtained from temporally sequential measurements from a single source, such measurements rely on the vehicle moving fast enough that the measurements cover enough area, but they also rely on accurate measurements of the vehicle speed to determine the relative position of the measurements. With two or more range finders fixedly attached to the vehicle frame and pointing in different directions, the relative angle between them can be selected so that they cover a desirable amount of terrain and also the distance covered is determined only be the angle between the range finders' directions (which can be very well known) and the distance above the ground. The use of a plurality of range finders allows the plurality of range measurements to be taken from the same vehicle location (and essentially simultaneously in time), thus not relying on vehicle motion between measurements. Particularly, with at least three range finders, the terrain gradient can be measured in two dimensions without any vehicle movement, thus allowing a much greater chance of a terrain-based location fix.

The terrain-based navigation system may comprise a processor arranged to: receive range data from each of the plurality of range finders; receive attitude data on the attitude of the vehicle frame; process the range data and the attitude data to generate terrain profile information; and correlate the terrain profile information with stored terrain map data to estimate a position of the vehicle frame. As the laser range finders are fixedly attached to the vehicle frame, the attitude data of the vehicle frame provides information on the attitude of each laser range finder and therefore allows the processor to determine the direction of the laser range finder relative to the terrain. Together with the range information this provides information on the shape of the terrain relative to the vehicle which can then be used for terrain matching with stored map data. Of course, other data such as a baro-inertial altitude can also be used to calculate the terrain shape relative to another reference such as mean sea level. In some examples the terrain-based navigation system may further comprise an inertial navigation system arranged to provide the attitude data.

In many systems it is desirable to have many different sensor inputs and use them all as sources of navigation data. All of those sources may then be processed and combined together for example using a Kalman filter. Therefore in some examples a radar altimeter may be used alongside the laser range finders as an additional source of measurement. However, the extra sensor adds cost to the navigation system and its information is redundant over the data from the laser range finders. Therefore in some preferred examples the navigation system has no radar altimeter. This reduces the overall cost and complexity of the system.

According to another aspect, this disclosure provides a terrain-based navigation system comprising: a plurality of laser range finders, each fixedly mounted to a vehicle body and each pointing in a different direction. The use of at least two fixed laser range finders allows a terrain gradient in one dimension to be obtained and this may in some situations provide enough information to obtain a location fix quicker than standard radar altimeter terrain based navigation systems without requiring a third laser range finder and a two-dimensional gradient calculation. All of the preferred features discussed above would also apply to this aspect of the disclosure.

This disclosure extends to a vehicle comprising: a vehicle body; and a terrain-based navigation system as discussed above, including any of the preferred or alternative forms, wherein the laser range finders are fixedly attached to the vehicle body.

The disclosure may be applied to any vehicle including land and sea vehicles, but it is particularly applicable to aircraft which have a good view of the underlying terrain and can fly over more varied terrain on a shorter timescale and can therefore gather sufficient information rapidly from a fixed field of view relative to the aircraft, without having to resort to expensive scanning systems. The disclosure is particularly beneficial for slower moving or hover-capable aircraft such as helicopters, drones or other VTOL aircraft.

This disclosure extends to a method of estimating a location of a vehicle, comprising: obtaining range data from each of at least three laser range finders, each pointing in a different fixed direction; obtaining attitude data for the vehicle; processing the range data and the attitude data to generate terrain gradient information; and correlating the terrain gradient information with stored terrain map data to estimate a location of the vehicle.

Similarly, this disclosure also extends to a method of estimating a location of a vehicle, comprising: obtaining range data from each of a plurality of laser range finders, each pointing in a different fixed direction; obtaining attitude data for the vehicle; processing the range data and the attitude data to generate terrain profile information; and correlating the terrain profile information with stored terrain map data to estimate a location of the vehicle.

The features described above in relation to the system, including the preferred and optional features, apply equally to the vehicle and to the method.

In particular, in some examples the attitude data may be obtained from an inertial navigation system. The method may further comprise: using the range data together with known angles between the directions of the laser range finders to calculate terrain gradient data; and wherein the correlating step comprises correlating the terrain gradient data with the stored terrain map data to estimate a location of the vehicle. The directions of the at least three laser range finders are preferably not co-planar and wherein the method comprises calculating terrain gradient data in two dimensions.

BRIEF DESCRIPTION OF DRAWINGS

One or more non-limiting examples will now be described, with reference to the accompanying drawings, in which.

DETAILED DESCRIPTION

Figure 1:
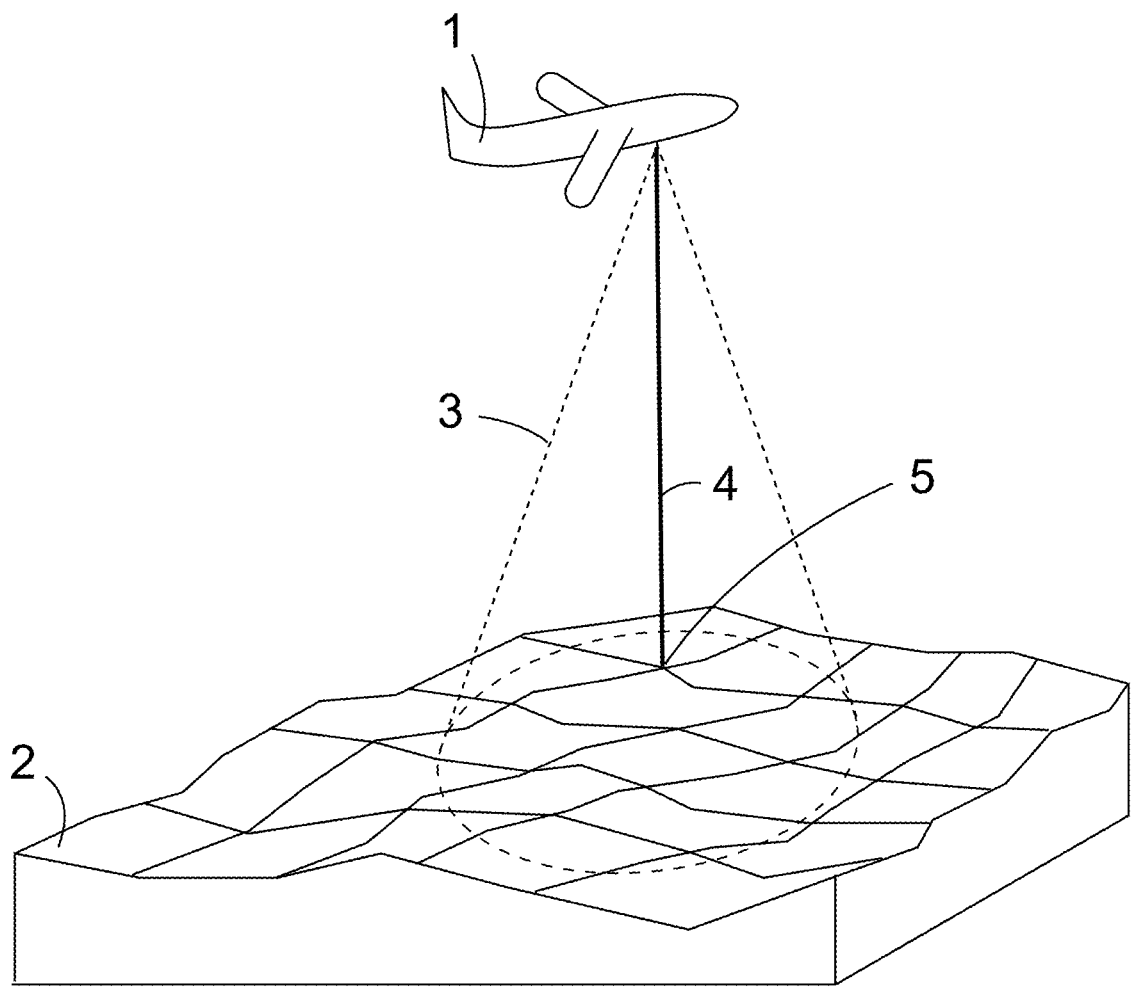
FIG. 1 shows the return signal from a conventional radar altimeter.

FIG. 1 shows a vehicle 1 above terrain 2. The vehicle 1 is shown here as an airplane flying over land, but could equally be another aircraft such as a helicopter or it could be a marine vehicle such as a ship or submarine above the seabed.

The aircraft 1 is fitted with a radar altimeter 3 which transmits a signal within the cone 3 towards the terrain 2. The return signal 4 that is received by the radar altimeter 3 is the first return that is received from the closest point 5 of the terrain 2 within the cone 3. The system determines the range from the aircraft 1 to that point 5 and combines this with a barometric altimeter measurement (providing height above mean sea level) to calculate the height of the terrain 2 above mean sea level at the point 5 which is assumed to be directly beneath the aircraft 1.

Over time, several such measurements of terrain height are acquired as the aircraft 1 traverses over the terrain 2, thus acquiring a profile of the terrain directly underneath the aircraft's path. Together with knowledge of the aircraft's relative movement (e.g. from other sources such as an Inertial Navigation System and/or Satellite Positioning System), the acquired terrain profile can be matched against a stored database of known terrain profile data to provide an estimate of the current location of the aircraft 1.

However, in the case of slow moving aircraft, the radar altimeter will acquire the terrain data slowly and therefore requires a longer time to get enough data for a good match. In a hovering vehicle such as a helicopter there may be no movement of the aircraft 1 relative to the terrain 2 and the radar altimeter will simply continue to acquire the first return signal from the same closest point 5 which is not sufficient to match the vehicle location to the terrain with any accuracy.

Figure 2A:
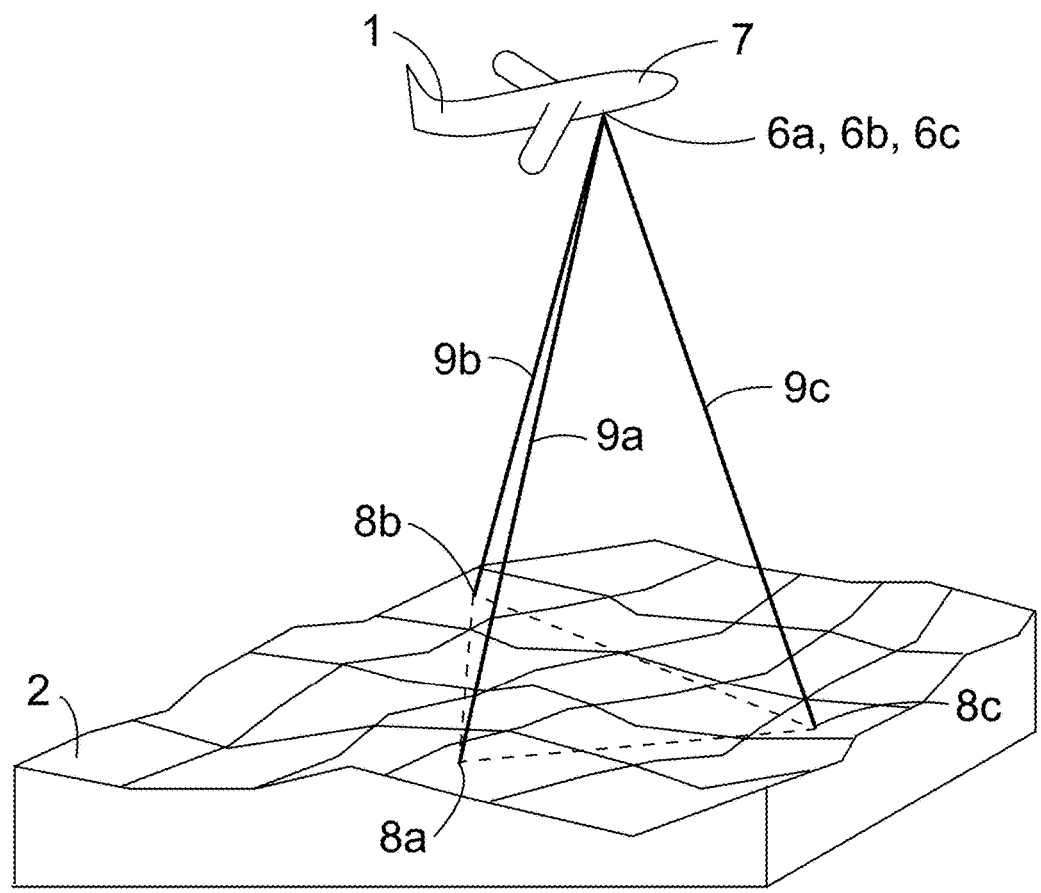
FIGS. 2a and 2b show arrangements of three laser range finders.
Figure 2B:
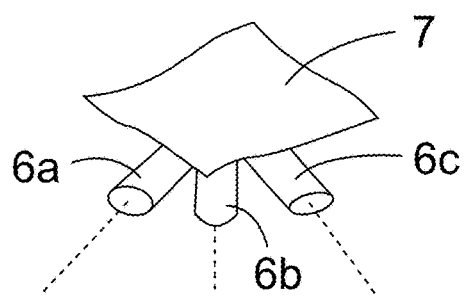

Turning to FIG. 2a, instead of using a single radar altimeter, the aircraft 1 is equipped with three laser range finders 6a, 6b, 6c shown enlarged in FIG. 2b. The three laser range finders 6a, 6b, 6c are fixed to the vehicle body 7 so that they move with the vehicle body 7 and do not move relative to the vehicle body 7. The laser range finders 6a, 6b, 6c are therefore not mounted on gimballed mounts, but rather their orientations relative to the vehicle body 7 remain fixed after installation.

The three laser range finders 6a, 6b, 6c are each pointed in a different direction and they are not coplanar such that when they are directed at the terrain 2 beneath the aircraft 1 they will not all be directed along a straight line. Instead, the three laser range finders 6a, 6b, 6c will cover an area of the terrain 2, i.e. the intersections of the laser beams with the terrain 2 will define a triangular area of terrain that lies within the three lines that connect any two of those intersections. In other words, the three laser range finders 6a, 6b, 6c are situated at one vertex of a tetrahedron and each laser range finder 6a, 6b, 6c is directed at another, different vertex of the tetrahedron. Each laser range finder provides a distance between the aircraft 1 and the corresponding intersection 8a, 8b, 8c with the terrain 2. This distance together with the known fixed geometry of the laser range finders relative to the aircraft body 7 and the barometric altitude allows the calculation of the height of the terrain at the corresponding intersection point 8a, 8b, 8c.

Figure 3:
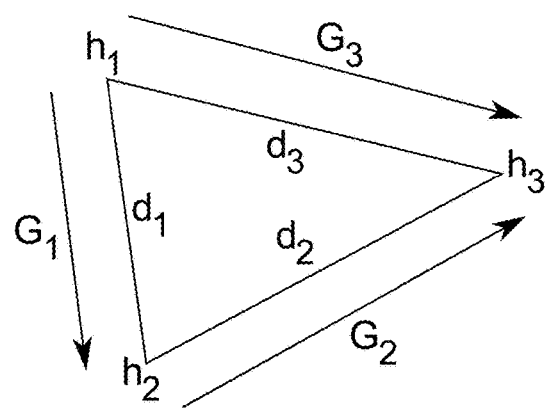
FIG. 3 shows the two-dimensional gradient calculations from the arrangements of FIGS. 2a-2b.

Therefore, with three laser range finders, three terrain heights can be obtained: h1, h2 and h3 as shown in FIG. 3. The known, fixed geometry of the three laser range finders 6a, 6b, 6c together with the measured ranges 9a, 9b, 9c can be used to calculate the distances d1, d2, d3 between the intersection points 8a, 8b, 8c. From these terrain heights h1, h2, h3 and distances d1, d2, d3, three terrain gradients can be calculated as follows:

$$G_1 = \frac{h_2 - h_1}{d_1}, G_2 = \frac{h_3 - h_2}{d_2}, G_3 = \frac{h_3 - h_1}{d_3}$$

It can be appreciated that these three gradients cover a two-dimensional area. Any of these gradients, preferably at least two or more preferably all three gradients can be used to provide a better terrain match with the stored terrain database and can allow a terrain match to be obtained even from a single measurement or when the aircraft 1 is hovering stationary above the terrain 2. Moreover any two of these gradients are in different, non-parallel directions and thus measure the terrain gradient in two dimensions.

It will be appreciated that more than three laser range finders can of course be used to cover more area and provide more terrain information in the form of more terrain height calculations and more terrain gradient calculations, thus improving the accuracy of a terrain match with the stored terrain database.

Figure 4:
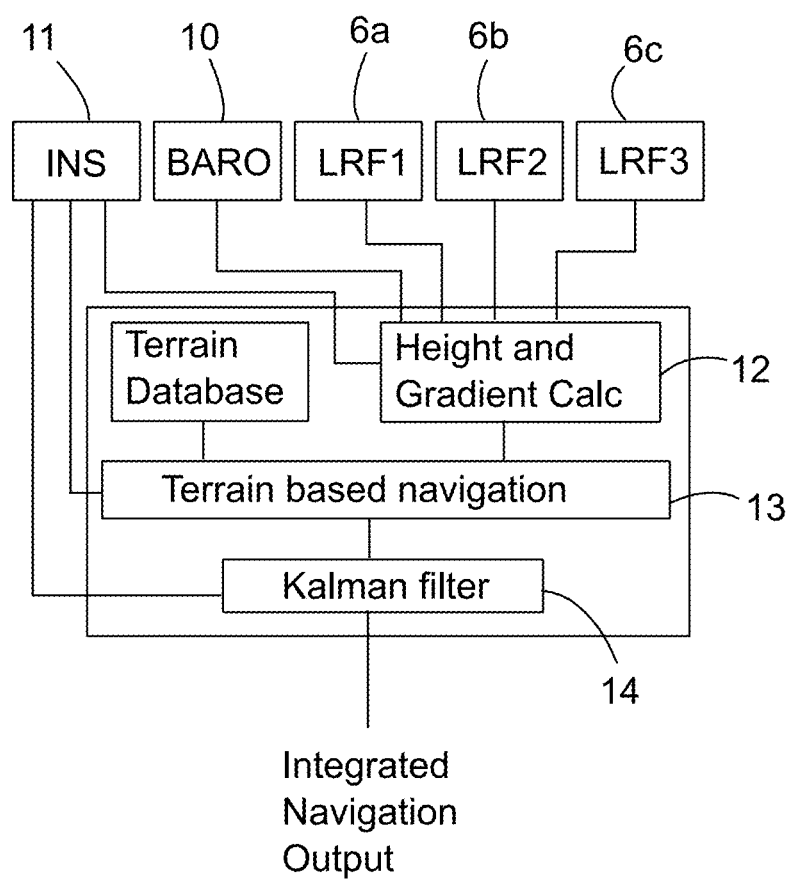
FIG. 4 schematically illustrates the components of a system.

A schematic illustration of the calculation system and method is provided in FIG. 4. The three laser range finders 6a, 6b, 6c are fed together with the output from barometric altimeter 10 and Inertial Navigation System 11 into height and gradient calculation unit 12 which calculates the heights h1, h2, h3 and gradients G1, G2, G3 as discussed above. This information together with information from the stored terrain database 13 is provided to terrain based navigation unit 14 which attempts to match the acquired terrain information with the stored terrain database by correlation techniques so as to estimate the current position of the aircraft 1. This location estimate is provided to Kalman Filter 14 which is also provided with position, velocity and attitude information from the INS 11 (as well as any other available navigation information such as GPS if available, although not shown here). The Kalman filter 14 processes these inputs and outputs an integrated navigation solution as the best estimate of current location based on all available information.

It will be appreciated FIG. 4 is illustrative and that the calculations and correlations could all be performed on the same processor as part of the same program and could be performed or partially performed as part of the operation of the Kalman filter 14 itself.

The invention claimed is:

1. A terrain-based navigation system comprising:
at least three laser range finders, each fixedly mounted to a vehicle body, each pointing in a different direction and arranged such that they can be used to calculate terrain gradient in two dimensions; and
a processor arranged to:
receive range data from each of the laser range finders;
receive attitude data on the attitude of the vehicle body,
process the range data and the attitude data to generate terrain profile information; and
correlate the terrain profile information with stored terrain map data to estimate a position of the vehicle body.

2. A terrain-based navigation system as claimed in claim 1, wherein the angle between the directions of at least two of the laser range finders is no more than 30 degrees.

3. A terrain-based navigation system as claimed in claim 1, wherein the angle between the directions of at least two of the laser range finders is at least 5 degrees.

4. A terrain-based navigation system as claimed in claim 3, wherein the direction of each laser range finder is at an angle of at least 5 degrees from each other laser range finder.

5. A terrain-based navigation system as claimed in claim 1, wherein beam directions of the least three laser range finders are not co-planar.

6. A terrain-based navigation system as claim 1, wherein three laser range finders are arranged at a vertex of a notional tetrahedron and each of the three laser range finders is directed along a different edge of the notional tetrahedron.

7. A terrain-based navigation system as claimed in claim 1, further comprising a processor arranged to receive range data from each of the laser range finders and to use the range data together with known angles between the directions of the laser range finders to calculate terrain gradient data.

8. A terrain-based navigation system as claimed in claim 1, further comprising an inertial navigation system arranged to provide the attitude data.

9. A terrain-based navigation system as claim 1, wherein the navigation system has no radar altimeter.

10. A vehicle comprising:
a vehicle body; and
a terrain-based navigation system as claimed in claim 1, wherein the laser range finders are fixedly attached to the vehicle body.

11. A method of estimating a location of a vehicle, comprising:
obtaining range data from each of at least three laser range finders, each pointing in a different fixed direction;
obtaining attitude data for the vehicle;
processing the range data and the attitude data to generate terrain gradient information; and
correlating the terrain gradient information with stored terrain map data to estimate a location of the vehicle.

12. A method as claimed in claim 11, wherein the attitude data is obtained from an inertial navigation system.

13. A method as claimed in claim 11, wherein generating terrain gradient information comprises using the range data together with known angles between the directions of the laser range finders; and wherein the correlating step comprises correlating the terrain gradient information with the stored terrain map data to estimate a location of the vehicle.

14. A method as claimed in claim 11, wherein the directions of the at least three laser range finders are not co-planar.

* * * * *